United States Patent
Crandall et al.

(10) Patent No.: US 8,150,406 B1
(45) Date of Patent: Apr. 3, 2012

(54) SYSTEM AND METHOD FOR PROVIDING ROBUST LOCATION BASED SERVICES

(75) Inventors: Evan Stephen Crandall, Basking Ridge, NJ (US); Steven Lloyd Greenspan, Scotch Plains, NJ (US); Wayzen Lin, White Plains, NY (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1187 days.

(21) Appl. No.: 10/331,216

(22) Filed: Dec. 30, 2002
(Under 37 CFR 1.47)

(51) Int. Cl.
*H04W 72/00* (2009.01)

(52) U.S. Cl. ............... 455/452.2; 455/432.1; 455/436; 455/441; 455/456.1; 455/456.2; 370/332; 370/333; 701/201; 701/209; 701/211

(58) Field of Classification Search .......... 455/436–442, 455/456.1–456.3
See application file for complete search history.

(56) References Cited

U.S. PATENT DOCUMENTS

| | | | |
|---|---|---|---|
| 6,327,471 B1 * | 12/2001 | Song .............................. | 455/440 |
| 6,708,090 B2 * | 3/2004 | Staggs ............................ | 701/3 |
| 6,731,612 B1 * | 5/2004 | Koss ............................ | 370/310 |
| 2003/0040331 A1 * | 2/2003 | Zhao ............................ | 455/552 |

FOREIGN PATENT DOCUMENTS

FR EP 1235451 * 8/2002

* cited by examiner

*Primary Examiner* — Dai A Phuong
(74) *Attorney, Agent, or Firm* — Parks IP Law LLC; Mickki D. Murray, Esq.

(57) ABSTRACT

A system and method for anticipating wireless signal loss and providing location based services in view of the anticipated wireless signal loss is disclosed.

20 Claims, 4 Drawing Sheets

SYSTEM AND METHOD FOR PROVIDING ROBUST LOCATION BASED SERVICES

CROSS REFERENCE TO RELATED APPLICATIONS

N/A

BACKGROUND OF THE INVENTION

The present invention relates to systems and methods for anticipating wireless signal loss and more particularly to systems and methods for providing robust location based services based on the anticipated wireless signal loss.

The quality and continuity of wireless service coverage varies greatly between different geographic locations. In a wireless telecommunication system, such as a cellular telephone system, telephone calls are dropped more often than in a conventional wired or wireline system. There are a number of reasons why a telephone call with a wireless telephone may be dropped or lost. One reason for dropped calls is that the wireless telephone has left the coverage area of the wireless system. As is well known, cellular telephone systems are divided into cells, each of which is served by a base station which communicates with wireless telephones (i.e., mobile telephones) located within the cell. The conglomeration of all the cells together make up the coverage area of a certain cellular system/service provider. If a mobile telephone travels outside the coverage area, the wireless communication channel between the mobile telephone and the wireless system will be lost and the call will be dropped. In some situations the mobile telephone may be entering the coverage area of another cellular service provider. In such a case, the call may continue only if the mobile telephone has roaming privileges in that other cellular system.

Another reason that an established call may be dropped in a cellular system is due to handoff. As is well known, when a mobile telephone travels from one cell to another cell, the call is handed off from the base station serving the one cell to the base station serving the other cell. In some situations the base station serving the other cell may not have any radio channels available for communication with the mobile telephone at the time of the handoff. In such a situation the established call with the mobile telephone will be dropped. Another reason for dropped calls in a cellular system is coverage holes or gaps, which are areas in the geographic serving area which do not receive signals from the system for some reason. Such coverage holes or gaps include both indoor and outdoor areas. If a mobile telephone enters a coverage hole where coverage is not available, radio communication with the serving base station will be lost and the call will be dropped. Calls in a cellular system may also be dropped due to RF interference, equipment failures and other environmental/structural obstacles which may impede signal establishment within the network.

Whether the wireless device is a telephone, laptop, palmtop or other device, the popularity of these devices is ever increasing. However, as the demand for these devices has exponentially increased, the quality of performance of many of these devices has somewhat suffered. This phenomenon is especially evident with respect to wireless telephones where one telephone from one service provider may have a completely different quality of reception than a telephone from another service provider in the same exact physical location. The brochures and information provided by wireless service providers thus only give general maps and locations as to their "reach" or coverage of service. However, as most people, especially those who commute back and forth between two fixed locations every day and those who may travel in the same general areas, it would be helpful to know beforehand, which service providers offer the best service in those predefined areas. For example, in large cities, reception quality can vary greatly due to the great amount of interference in those areas.

Accordingly, in view of the above it would be extremely desirable to be able to anticipate wireless signal loss and provide robust location based services even in view of an impending or occurring wireless signal loss.

SUMMARY OF THE INVENTION

The present invention is a method for anticipating wireless signal loss which includes receiving a request for location dependent information from a wireless device, determining a location of the wireless device to anticipate an impending signal loss for the wireless device, alerting the wireless device as to the impending signal loss and providing auxiliary location dependent information to the wireless device based on the impending signal loss.

In another embodiment, the present invention is a method for providing location dependent services comprising compiling a database of regions having inadequate wireless coverage, tracking a plurality of wireless devices to determine if one or more of the wireless devices are entering the regions having inadequate wireless coverage; and providing default location dependent information to wireless devices entering the regions having inadequate wireless coverage.

In another embodiment, the present invention is a method for maintaining wireless information service continuity in area with service gaps which includes tracking a wireless user to determine if the wireless user is in proximity of an area known to have service gaps and serving requests from the wireless user as the wireless user moves in and out of the area known to have service gaps, wherein one or more pre-cached information streams are provided to the wireless user in these areas.

DETAILED DESCRIPTION OF THE INVENTION

The present invention is directed to a system and method for anticipating wireless signal loss and providing location based services based on this anticipated wireless signal loss. Current techniques for location based services depend upon knowing the current position of the user and being able to send service related content to an output device that is being used by the user. For example, a user might request and receive a list of nearby restaurants which, in one example, is then displayed on a visual output device, e.g., a PDA or SMS enabled wireless phone. However, location determining signals (regardless of technique) and wireless content transmission and reception sometimes fail. For example, users are often blocked from receiving position and content when they are inside a building or other location where signal transmission is obstructed. When outside, a user may receive position signals but may be unable to receive or send content. Additionally, a user may be able to receive or send content when inside a building (using a wireless LAN) but may be unable to receive valid position data. The present invention overcomes these problems and others.

In the present invention, such wireless signal loss or service interruption as discussed above typically involve the unwanted cessation of temporal communications which commonly occurs, for example, during wireless communications. Service interruptions may occur for a variety of reasons such as signal interference, out of range communications, weather factors, other environmental factors, etc. For exemplary purposes, the details of the invention will be discussed with respect to a wireless communication environment but the teachings herein are applicable to service interruptions such as may occur over a variety of communication forms, media and protocols such as a service interruption which may result from a cut or damaged cable, for example, in a wireline based communications environment.

As used herein, the terms "location based services", "location dependent services", "location related services", "position dependent services" and "position related services" are used to refer to data, information and/or services which relate in some fashion or are associated with a certain location, locale or area. For example, such information may be as simple as locating a money dispensing machine in a certain area, looking for a local town coffee shop, checking local hotel availabilities, verifying street names and addresses, checking for historical/tourist landmarks and sites, searching for local restaurants, etc. Such location dependent information may be accessed by anyone, such as tourists, travelers, business people, students, and the local populace in general in urban, rural or remote locations during recreational, casual and/or business trips, outings or visits.

Figure 1:
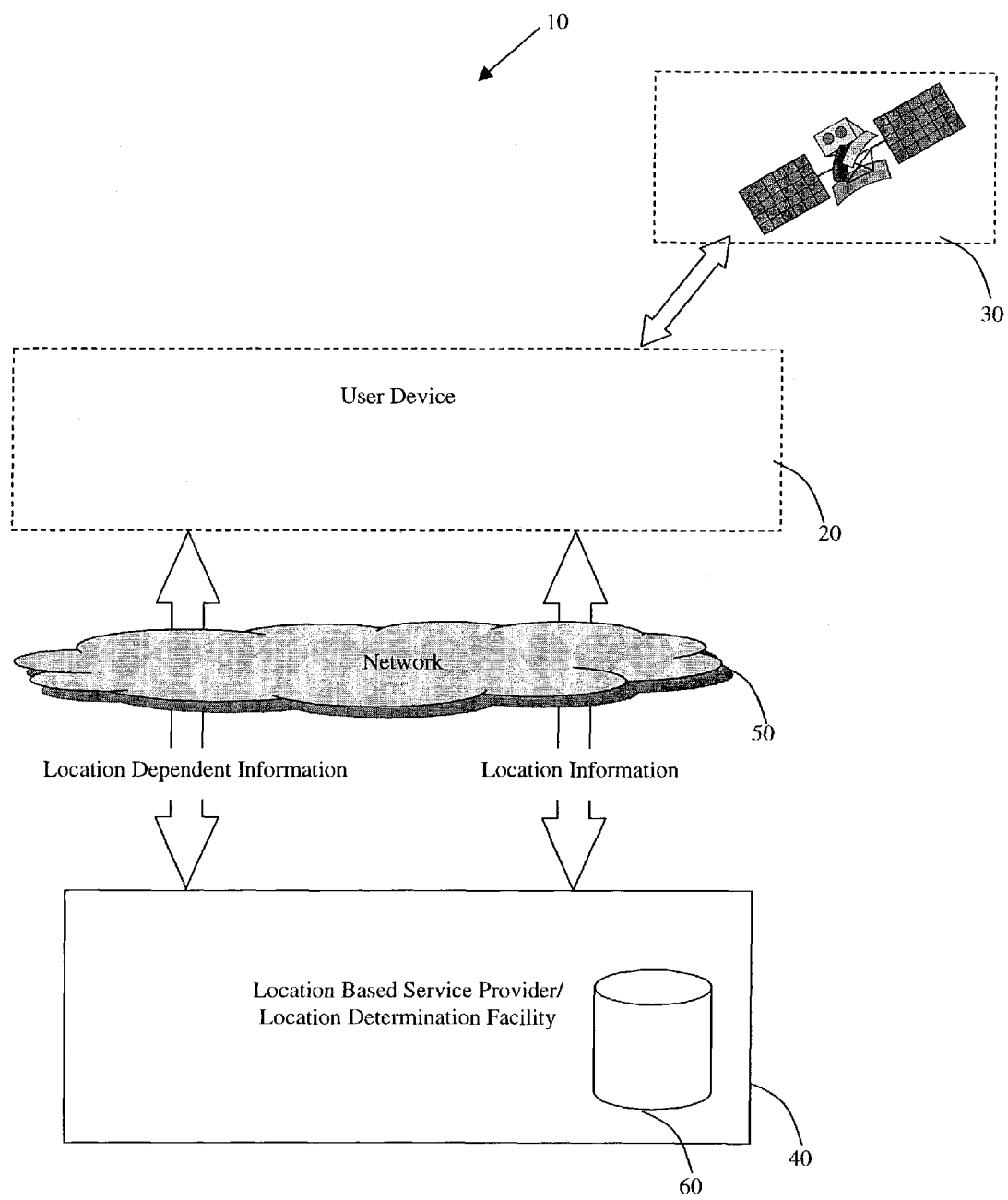
FIG. 1 illustrates an exemplary system of the present invention.

Referring to FIG. 1, there is shown a system 10 in accordance with the teachings of the present invention. System 10 includes a user device 20 which is a communication device which is location or geographic positioning enabled. In the present embodiment, communications are exchanged via a variety of user devices such as wireless telephones but may also include laptops, personal digital assistants (PDAs), handhelds, PCs, pagers and other communication devices which allow individuals, groups and communities to communicate with one another from a variety of geographical locations. As used herein, the term "party", "user" or "subscriber" may refer to an individual user, or may be used interchangeably to refer collectively to a group of users or a community of users.

Figure 2:
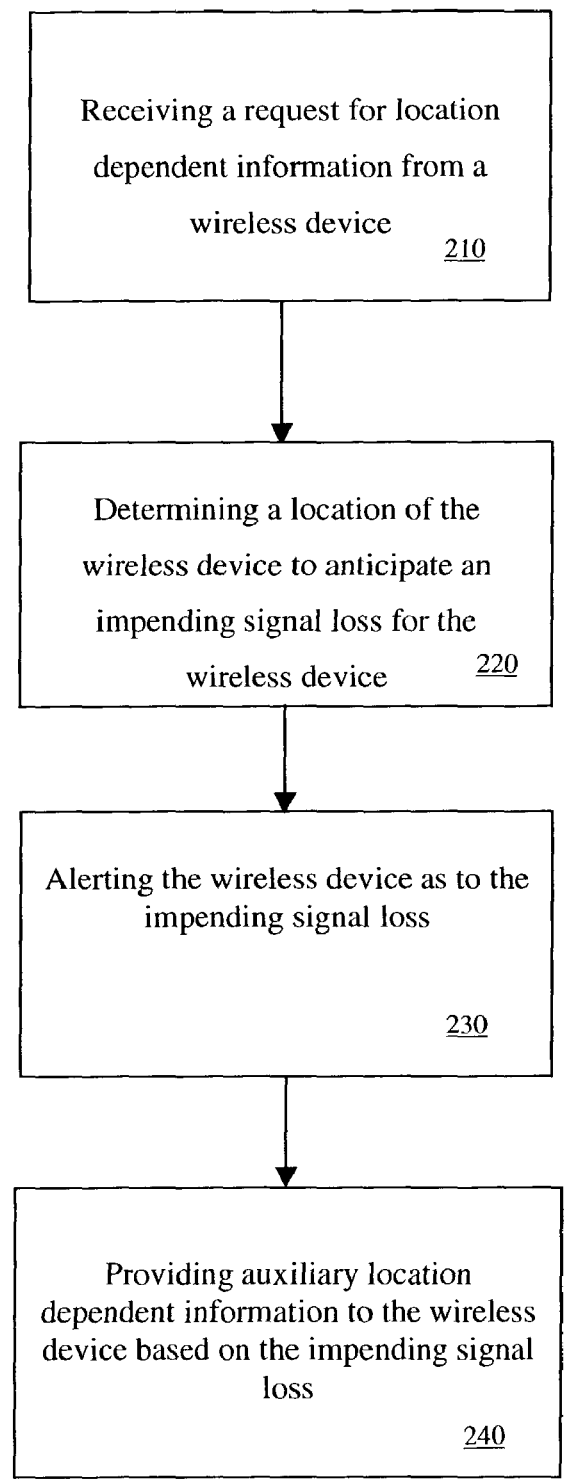
FIG. 2 illustrates an exemplary method of the present invention.

Referring still to FIG. 2, user device 20 operates in conjunction with a geographic locator sub-system 30, such as a Global Positioning System (GPS) or other positioning determination system, such as a cellular network system. As used herein, the term "location enabled device" refers both to a device having inherent geographic positioning capabilities such as a GPS device or alternatively, to a device whose geographic location can be determined by virtue of a network in which the device operates, such as a cellular or wireless telephone. In the present invention, it is contemplated that a wide variety of technologies and methodologies can be utilized to providing geographical position information on a real-time basis. These may include systems for tracking, for example, mobile phone position via cellular cell broadcasts and the use of GPS enabled devices such as PDAs, mobile computers and mobile phones, which typically utilize an existing constellation of satellites that transmit GPS signals that can be used by the GPS enabled device to determine the device's position. Techniques for locating a source of a transmission or a communication such as a cellular telephone transmission are known in the art and can include techniques utilizing triangulation methods where three or more receiving sites are enabled to receive a transmission and correspondingly triangulate a bearing based on the received signals.

Referring again to FIG. 1, user device 20 is in communication with an location based information service provider/location determination facility 60 via a network 50. Network 50 may be a distributed information network like the Internet, or alternatively, network 50 may be a geographically dispersed communication network like a wide area network (WAN), a local area network (LAN) and/or combination thereof. It is contemplated that the wide area network may be privately owned or rented, but will many times be a combination thereof, with the inclusion of public (shared user) networks within a private network. Network 50 may also be an intermediate form of network in terms of geography, such as a metropolitan area network (MAN). In another embodiment, network 50 may be a specialized voice controlled call center, a wireless carrier network, a localized fixed wireless network or other similar network through which communications from user devices may be established with location based information service provider/location determination facility 40. It also will be evident to one skilled in the art that a connection to a information service provider may be established either directly, or through a single or combination of the aforementioned networks or other similar network(s).

Referring again to FIG. 1, in one exemplary basic configuration, system 10 includes one or more user devices. Although only one user device is illustrated in FIG. 1, it is contemplated that more than one user may have access to system 10 at any one time. It is also contemplated that multiple users may share a single device, or a single user may have multiple devices. Preferably, the system is used by a large multitude of users devices which are experiencing a large number of service interruptions.

Referring still to FIG. 1, location based service provider 40 also includes a database 60. Database 60 contains information related to "dark" regions or regions/areas known to have poor wireless signal/reception. In one embodiment, database 60 may be populated by with location coordinates of regions that are known to have poor receptivity. For example, for areas where it is known to have poor reception, the coordinates of the area would be stored within database 60. Information related to such areas may be received from a variety of sources, such as from the wireless service providers, from other users, etc. In another embodiment, database 60 is populated utilizing a dynamic signal strength monitoring system which may operate as follows. A "heartbeat" or tracking signal is sent periodically from a user device to a wireless service access point or base station, and is subsequently relayed to a data server. Such a signal contains data regarding current position, signal strength from access point. Statistics are maintained regarding user device, time and date, signal strength, geographic location, and estimated speed and direction (based on previously received heartbeats.)

These statistics are used to determine where (and when) signals are commonly lost (based on last received heartbeat and the associated velocity). Signals may be lost because of environmental obstruction or because users switched off device. Similarly, these statistics are used to determine where (and when) signals are commonly regained (based on heartbeats received after some period of interruption), and the associated velocity. Such statistics may then be maintained within database 60.

Based on the above methods, the likelihood of an impending signal loss can be predicted, and the user's device can be notified. The notification can trigger an alert signal thereby notifying the user, or the notified device can request all location-dependent messages that are intended for the user or application (e.g., a list local restaurants) and whose associated locations are within the anticipated "dark" region. Thus for example, if many users commonly lose the ability to receive content whenever they enter a particular building, the messages that a user might receive in that building are pre-cached. If the building has a local positioning system, then messages are displayed when the user is at the appropriate location and requests the associated data. Otherwise if the building blocks the location determining signals and does not provide more accurate position data, a list of messages for the entire region is displayed. When messages are "dropped" at a location, the upstream signal is delayed until a clear signal path is available. The location used to index the message follows the logic described above.

In the present invention, communication network 50 generally provides interconnection utilizing various interconnection architectures including Internet Protocol (IP) based networks such as the Internet, the public switched telephone network (PSTN), ATM networks, signaling networks, wireless networks, satellite networks, fixed wireless networks, DSL networks as well as other systems. Communication network 70 provides versatile intelligent conduits that may carry, for example, Internet Protocol (1P) telephony or multimedia signals between the customer premises over, for example, the public switched telephone network, Internet, or wireless communication networks.

In the present invention, communications, such as between user access devices are enabled by variety of networks, protocols and standards including, but not limited to AMPS, N-AMPS, TDMA, CDMA, GSM, TACS, ESMR, GPRS, Bluetooth, IEEE 802.11, infrared, TCP/IP, SMS, space-time coding and other related networks, protocols and standards. As used herein, the networks described herein may include base stations, regional stations, central stations and transmitters that are interconnected by landline trunks, base stations, satellites, antennas, routers, bridges and wireless connections to facilitate the necessary connections to establish the user communications.

With reference to FIG. 2, in one embodiment, the present invention is a method which includes receiving a request for location dependent information from a wireless device, step 210. The method also includes determining a location of the wireless device to anticipate an impending signal loss for the wireless device, step 220. The method also includes alerting the wireless device as to the impending signal loss, step 230. The method also includes providing auxiliary location dependent information to the wireless device based on the impending signal loss, step 240.

Figure 3:
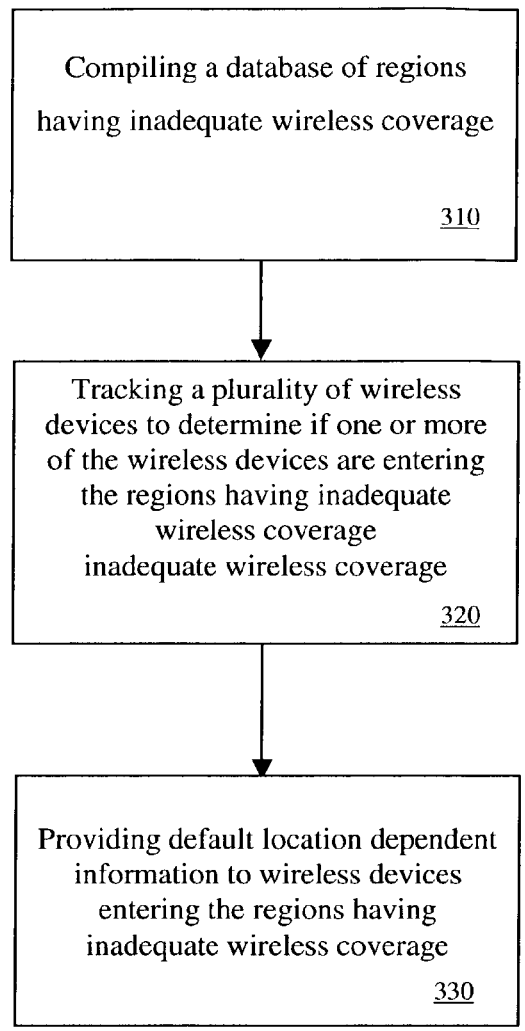
FIG. 3 illustrates another exemplary method of the present invention.

With reference to FIG. 3, in one embodiment, the present invention is a method for providing location dependent services. The method also includes compiling a database of regions having inadequate wireless coverage, step 310. The method also includes tracking a plurality of wireless devices to determine if one or more of the wireless devices are entering the regions having inadequate wireless coverage, step 320. The method also includes providing default location dependent information to wireless devices entering the regions having inadequate wireless coverage, step 330.

Figure 4:
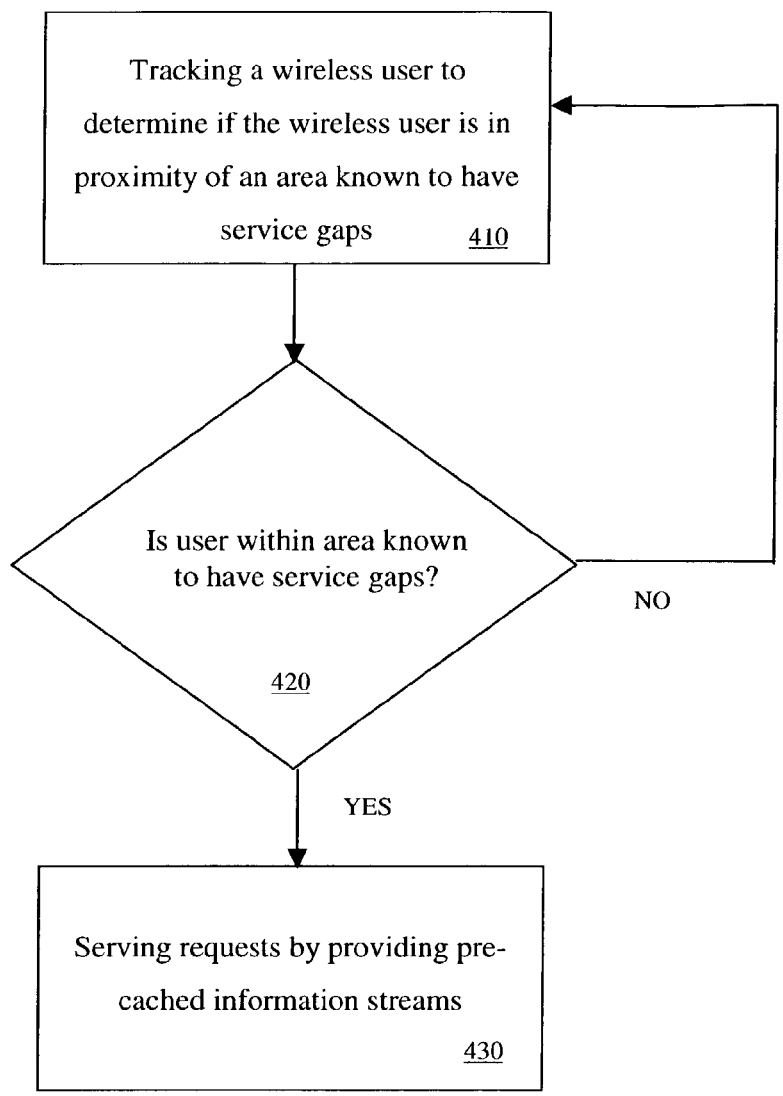
FIG. 4 illustrates yet another exemplary method of the present invention.

With reference to FIG. 4, in one embodiment, the present invention is a method for maintaining wireless information service continuity in area with service gaps. The method also includes tracking a wireless user to determine if the wireless user is in proximity of an area known to have service gaps, step 410. The method also includes determining if the user is within area known to have service gaps?, step 420. The method also includes serving requests by providing pre-cached information streams, step 430.

While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular component or step to the teachings of the invention without departing from the scope thereof. For example, while the teachings here are discussed primarily with reference to wireless communications, the present inventive teachings may be easily applied to other types of communications, including wireline based communications and combinations of wireline and wireless communications. Therefore, it is intended that the invention not be limited to the particular embodiment disclosed, but that the invention will include all embodiments falling within the scope of the appended claims.

We claim:

1. A method, for providing, to a wireless device, auxiliary location-dependent information particular to a first area having wireless signal degradation and to which the wireless device is expected to travel, comprising:

receiving, from a wireless device positioned in a second area in which there is no signal degradation for the wireless device, a request for location-dependent information related to a first area to which the wireless device is expected to travel;

determining that the first area, to which the wireless device is expected to travel, is an area of signal degradation for the wireless device;

in response to receiving the request for location-dependent information and (ii) determining that the first area to which the wireless device is expected to travel is an area of signal degradation for the wireless device, determining, while the wireless device is still in the second area in which there is no signal degradation for the wireless device, auxiliary location-dependent information for the wireless device, wherein the auxiliary location-dependent information is particular to locations within the first area, having signal degradation for the wireless device, and to which the wireless device is expected to travel; and initiating providing provision of the auxiliary location-dependent information to the wireless device while the wireless device is still in the second area, having no signal degradation, for use at the wireless device, when the wireless device is located in the first area of signal degradation.

2. The method of claim 1, wherein identifying determining that the area to which the wireless device is expected to travel is associated with the first area of signal degradation for the wireless device is based on a location of the wireless device.

3. The method of claim 1, wherein the request for location-dependent information is a Hypertext Transfer Protocol-based request.

4. The method of claim 1, further comprising receiving a locating signal from the wireless device.

5. The method of claim 1, wherein determining that the area to which the wireless device is expected to travel is associated with the first area of signal degradation for the wireless device is based on a database of known regions having poor wireless reception.

6. The method of claim 1, wherein the locations of the auxiliary location-dependent information, within the first area of signal degradation, include at least one location selected from a group of locations consisting of:
- a banking entity;
- a food-services establishment;
- beverage-services establishment;
- an entity providing sleeping accommodations;
- a historical location;
- a tourist attraction;
- an academic establishment; and
- a recreational location.

7. The method of claim 1, further comprising:
- initiating a providing of an alert to the wireless device regarding the signal degradation in the first area to which the wireless device is expected to travel; and
- receiving a request for the auxiliary location-dependent information from the wireless device, following alerting the wireless device of the signal degradation in the first area for the wireless device.

8. The method of claim 7, wherein initiating the providing of the alert to the wireless device comprises initiating the providing of an alert signal to the wireless device.

9. The method of claim 1, wherein the auxiliary dependent information particular to the first area having signal degradation, and to which the wireless device is expected to travel, contains pre-cached location-dependent information.

10. The method of claim 1, further comprising delaying upstream communications from the wireless device in connection with the first area of signal degradation.

11. The method of claim 1, the method further comprising:
- transmitting an alert signal to the wireless communication device in response to determining that the first area, to which the wireless device is expected to travel, is the first area of signal degradation for the wireless device;
- wherein said receiving is performed in response to the alert triggering the wireless device to automatically submit the request for the location-dependent information regarding the first area of signal degradation to satisfy an anticipated need of a location-sensitive application of the wireless device.

12. A non-transitory computer-readable storage medium, for providing, to a wireless device, auxiliary location-dependent information particular to a first area having wireless signal degradation and to which the wireless device is expected to travel, comprising instructions that, when executed by a processor, cause the processor to perform a method comprising:
- receiving, from a wireless device positioned in a second area in which there is no signal degradation for the wireless device, a request for location-dependent information related to a first area to which the wireless device is expected to travel;
- determining that the first area, to which the wireless device is expected to travel, is with an area of signal degradation for the wireless device;
- in response (i) to receiving the request for location-dependent information and (ii) determining that the first area to which the wireless device is expected to travel is an area of signal degradation for the wireless device, determining, while the wireless device is still in the second area in which there is no signal degradation for the wireless device, auxiliary location-dependent information for the wireless device, wherein the auxiliary location-dependent information is particular to locations within the first area, having signal degradation for the wireless device, and to which the wireless device is expected to travel; and
- initiating providing of the auxiliary location-dependent information to the wireless device while the wireless device is still in the second area, having no signal degradation, for use at the wireless device, when the wireless device is located in the first area of signal degradation.

13. The non-transitory computer-readable storage medium of claim 12, wherein identifying the first area of signal degradation for the wireless device is based on a location of the wireless device.

14. The non-transitory computer-readable storage medium of claim 12, wherein the instructions are configured to further cause the processor to receive a locating signal from the wireless device.

15. The non-transitory computer-readable storage medium of claim 12, wherein determining the first area of signal degradation is based on a database of known regions having poor wireless reception.

16. The non-transitory computer-readable storage medium of claim 12, wherein the locations of the auxiliary location-dependent information, within the first area of signal degradation, include at least one location selected from a group of locations consisting of:
- a banking entity;
- a food-services establishment;
- a beverage-services establishment;
- an entity providing sleeping accommodations;
- a historical location;
- a tourist attraction;
- an academic establishment; and
- a recreational location.

17. The non-transitory computer-readable storage medium of claim 12, wherein the instructions are configured to further cause the processor to:
- initiate a providing of an alert to the wireless device of the expected signal degradation at the first area; and
- receive a request from the wireless device for the auxiliary location-dependent information, following alerting the wireless device of the signal degradation in the first area to which the wireless device is expected to travel.

18. The non-transitory computer-readable storage medium of claim 12, wherein, the auxiliary location-dependent information is provided to the wireless device for reference by a user of the wireless device while the wireless device is located in the first area of signal degradation.

19. The non-transitory computer-readable storage medium of claim 12, further comprising delaying upstream communications from the wireless device in connection with the first area of signal degradation.

20. The non-transitory computer-readable storage medium of claim 12, the method further comprising:
- transmitting an alert signal to the wireless communication device in response to determining that the first area, to which the wireless device is expected to travel, is the first area of signal degradation for the wireless device;
- wherein said receiving is performed in response to the alert triggering the wireless device to automatically submit the request for the location-dependent information regarding the first area of signal degradation to satisfy an anticipated need a location-sensitive application of the wireless device.

* * * * *